Aug. 6, 1929.   W. E. DEAN   1,723,137
FLUID PRESSURE BRAKE
Filed May 26, 1928
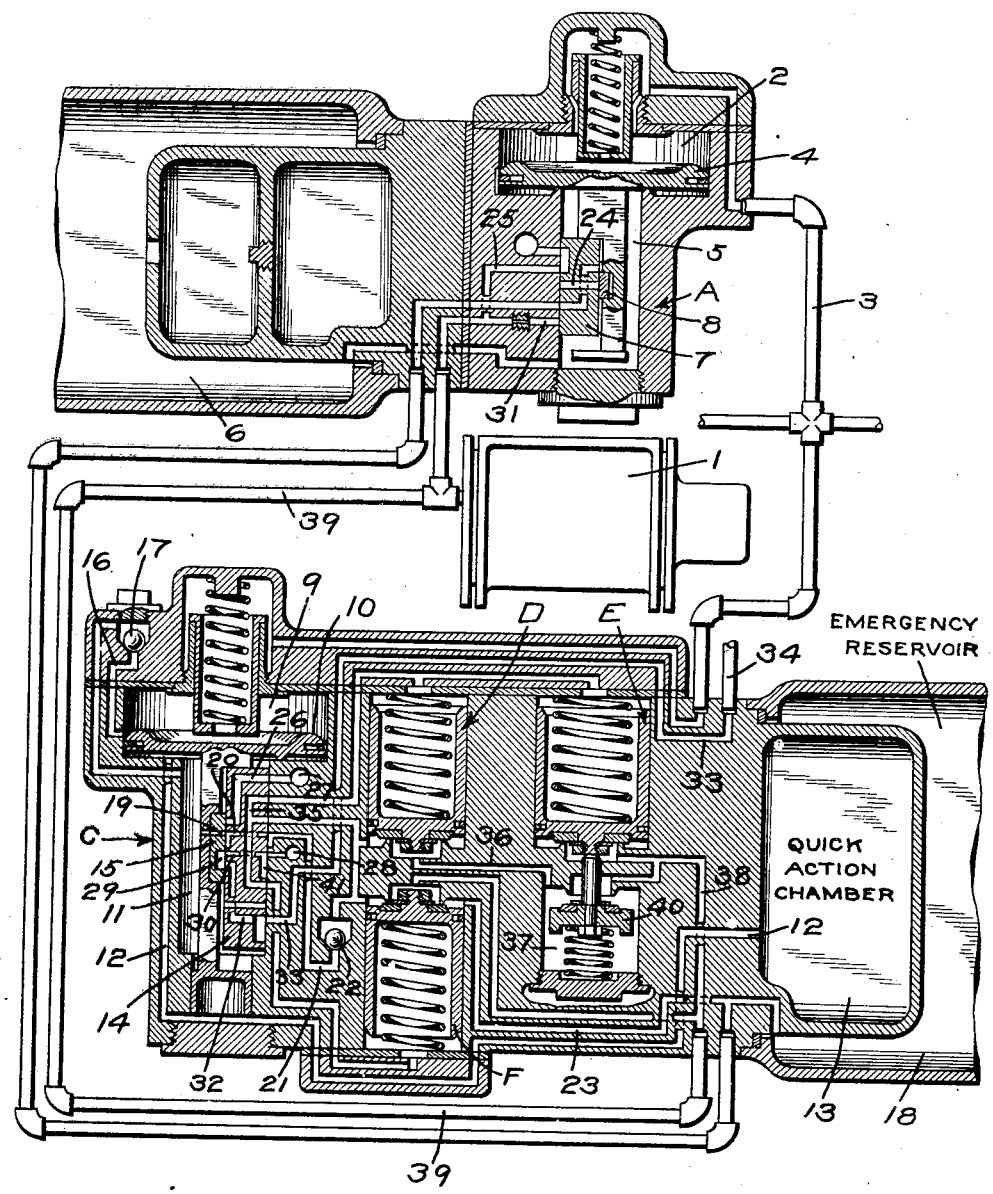
INVENTOR
WILLIAM E. DEAN
BY
ATTORNEY Patented Aug. 6, 1929.

1,723,137

UNITED STATES PATENT OFFICE.

WILLIAM E. DEAN, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FLUID-PRESSURE BRAKE.

Application filed May 26, 1928. Serial No. 280,684.

This invention relates to fluid pressure brakes, and more particularly to an apparatus for initiating an emergency application of the brakes.

It has heretofore been proposed to provide an emergency valve mechanism having a normally charged quick action chamber and a piston subject to the opposing pressures of the brake pipe and the quick action chamber for operating valve means upon a sudden reduction in brake pipe pressure to initiate an emergency application of the brakes.

With the prior devices, the quick action chamber is charged from the brake pipe and in releasing the brakes, when the brake valve is turned to release position, the brake pipe may be charged on cars toward the front end of the train to a pressure in excess of the normal standard pressure carried in the system. When the brake valve is turned to running position, the brake pipe pressure subsides to the normal pressure and if any of the quick action chambers have been charged in excess of the normal pressure, while the brake valve was in release position the corresponding emergency valve device is liable to be operated so as to initiate an emergency application of the brakes.

One object of my invention is to prevent the overcharging of the quick action chamber when the brake pipe pressure is increased to effect the release of the brakes.

The above object of my invention is accomplished by connecting the emergency reservoir of the equipment with the quick action chamber in the release position of the apparatus, so that any tendency to overcharge the quick action chamber will also tend to overcharge the emergency reservoir and the combined volumes of the emergency reservoir and the quick action chamber being relatively large, any excess in brake pipe pressure will not be effective to overcharge the quick action chamber to a harmful extent.

In order to prevent possible leakage of fluid from the emergency reservoir into the quick action chamber when a service application of the brakes is effected, another object of my invention consists in providing means for venting the passage through which the quick action chamber is connected to the emergency reservoir to the atmosphere, when a service application of the brakes is effected.

In the accompanying drawing, the single figure is a diagrammatic sectional view of a fluid pressure brake apparatus embodying my invention.

In order to illustrate one application of my invention, I have shown the same applied in connection with a fluid pressure brake apparatus of the type shown in Patent No. 1,585,774 of C. C. Farmer, granted May 25, 1926, and comprising a brake cylinder 1, a triple valve device A, an emergency valve device C, an initial inshot valve device D, a cut-off valve device E, and a final inshot valve device F.

The triple valve device A comprises a casing having a piston chamber 2 connected to the brake pipe 3 and containing a piston 4, and a valve chamber 5, connected to the auxiliary reservoir 6, and containing a main slide valve 7, and a graduating slide valve 8, adapted to be operated by piston 4.

The emergency valve device C comprises a casing having a piston chamber 9, connected to the brake pipe 3 and containing a piston 10 and a valve chamber 11, connected through passage 12 with a quick action chamber 13, and containing a main slide valve 14, and an auxiliary slide valve 15 adapted to be operated by piston 10.

When the brake pipe is charged with fluid under pressure, fluid flows through the feed groove around piston 4 and charges the valve chamber 5 and the auxiliary reservoir 6. Fluid also flows to piston chamber 9 and through passage 16 past check valve 17 to valve chamber 11 and from valve chamber 11 through passage 12 to quick action chamber 13. With the piston 10 in normal release position, fluid also flows from valve chamber 11 to the emergency reservoir 18, through port 19 in auxiliary slide valve 15, port 20 in main slide valve 14, passage 21, and past the check valve 22 to passage 23, which leads to the emergency reservoir.

When the brake pipe pressure is reduced at a gradual rate to effect a service application of the brakes, the piston 4 is moved to service position, in which fluid under pressure is supplied from the auxiliary reservoir 6 to the brake cylinder 1 through port 24 in slide valve 7 and passage 25.

The emergency piston 10 is also moved to service position upon a service reduction in brake pipe pressure, and in this position, port 19 registers with port 26 in slide valve 14.

The port 26 now registers with an exhaust port 27, the slide valve 14 remaining in release position, and fluid under pressure is vented from valve chamber 11 and the quick action chamber 13. When the pressure in valve chamber 11 has been reduced slightly below the pressure in the brake pipe, the piston 10 will be shifted to its normal release position.

In service position, passage 21 is connected to an exhaust port 28, through port 20, cavity 29 in the auxiliary slide valve 15, and port 30, so that any leakage of fluid from the emergency reservoir 18 past the check valve 22, will be vented to the atmosphere.

When the brake pipe pressure is reduced at an emergency rate, the triple valve piston 4 is shifted to emergency position, in which passage 31 is uncovered by the movement of slide valve 7, so that fluid under pressure is supplied from the auxiliary reservoir 6 to the brake cylinder.

The emergency piston 10 is also shifted to emergency position, in which position port 32 in slide valve 14 registers with passage 33 and in which said port is uncovered by the movement of the auxiliary valve 15. Fluid under pressure is then supplied from the quick action chamber to pipe 34, which is connected to a quick action valve device (not shown) and which is operated by fluid under pressure to effect a local reduction in brake pipe pressure.

In emergency position, the spring side of the valve devices D and E are connected to the atmosphere through cavity 35 in slide valve 14.

The valve device D is then operated to open communication from the emergency reservoir 18 to the brake cylinder, through passage 36, valve chamber 37, passage 38, and pipe 39. When the brake cylinder pressure has been increased to a predetermined degree, the valve device E is operated to close the valve 40 and thereby prevent the further flow of fluid from the emergency reservoir to the brake cylinder.

When the brake cylinder pressure has been increased to a predetermined degree by flow from the auxiliary reservoir to the brake cylinder, the valve device F is operated to again open communication from the emergency reservoir to the brake cylinder, so as to produce a high emergency pressure in the brake cylinder.

When the emergency valve device moves to emergency position, fluid under pressure is gradually vented from valve chamber 11 and the quick action chamber 13 by operation of the usual quick action valve device (not shown) which is connected to pipe 34, and in order to prevent the lifting of the main slide valve 14 from its seat by possible leakage of fluid under pressure from the emergency reservoir 18 past the check valve 22 to passage 21, which leakage pressure would then act on the under side of said slide valve, a cavity 41 in the slide valve 14 is adapted to connect passage 21 with exhaust port 28, as the slide valve 14 moves toward emergency position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, of an emergency reservoir, a quick action chamber adapted to be charged with fluid under pressure from the brake pipe, an emergency valve device subject to the opposing pressures of the brake pipe and the quick action chamber and operated upon a sudden reduction in brake pipe pressure for effecting an emergency application of the brakes, and means for connecting the emergency reservoir to the quick action chamber when the quick action chamber is charged from the brake pipe.

2. In a fluid pressure brake, the combination with a brake pipe, of an emergency reservoir, a quick action chamber adapted to be charged with fluid under pressure from the brake pipe, an emergency valve device subject to the opposing pressures of the brake pipe and the quick action chamber and operated upon a sudden reduction in brake pipe pressure for effecting an emergency application of the brakes, said emergency valve device being adapted in release position to connect the brake pipe with the quick action chamber and the quick action chamber with the emergency reservoir.

3. In a fluid pressure brake, the combination with a brake pipe, of an emergency reservoir, a quick action chamber adapted to be charged with fluid under pressure from the brake pipe, an emergency valve device subject to the opposing pressures of the brake pipe and the quick action chamber and operated upon a sudden reduction in brake pipe pressure for effecting an emergency application of the brakes, said emergency valve device being adapted in release position to connect the brake pipe with the quick action chamber and the quick action chamber with the emergency reservoir, and said emergency valve device having a position in which the passage through which the emergency reservoir is charged is connected to the atmosphere.

4. In a fluid pressure brake, the combination with a brake pipe, of an emergency reservoir, a quick action chamber adapted to be charged with fluid under pressure from the brake pipe, an emergency valve device subject to the opposing pressures of the brake pipe and the quick action chamber and operated upon a sudden reduction in brake pipe pressure for effecting an emergency application of the brakes, said emergency valve device being adapted in release position to connect the brake pipe with the quick action chamber and the quick action chamber with the emergency reservoir, and said emergency valve device being adapted upon movement from release position to connect the passage through which the emergency reservoir is charged, to the atmosphere.

5. In a fluid pressure brake, the combination with a brake pipe, a quick action chamber, and an emergency reservoir, of an emergency valve device having a release position and an emergency position, the quick action chamber being charged from the brake pipe in release position and the emergency reservoir being connected to the quick action chamber, and upon movement of the emergency valve device from release position, the passage which connects the quick action chamber with the emergency reservoir being connected to the atmosphere.

6. In a fluid pressure brake, the combination with a brake pipe, a quick action chamber, and an emergency reservoir, of an emergency valve device having a release position and an emergency position, the quick action chamber being charged from the brake pipe in release position and the emergency reservoir being connected to the quick action chamber, and upon movement of the emergency valve device from release position, the passage which connects the quick action chamber with the emergency reservoir being connected to the atmosphere, and a check valve for preventing back flow from the emergency reservoir to the quick action chamber.

In testimony whereof I have hereunto set my hand, this 23rd day of May, 1928.

WILLIAM E. DEAN.